United States Patent [19]
Jody et al.

[11] Patent Number: 5,653,867
[45] Date of Patent: Aug. 5, 1997

[54] METHOD FOR THE SEPARATION OF HIGH IMPACT POLYSTYRENE (HIPS) AND ACRYLONITRILE BUTADIENE STYRENE (ABS) PLASTICS

[75] Inventors: Bassam J. Jody, Chicago, Ill.; Bayram Arman, Amherst, N.Y.; Dimitrios E. Karvelas, Downers Grove, Ill.; Joseph A. Pomykala, Jr., Crest Hill, Ill.; Edward J. Daniels, Oak Lawn, Ill.

[73] Assignee: The University of Chicago, Chicago, Ill.

[21] Appl. No.: 618,625

[22] Filed: Mar. 19, 1996

[51] Int. Cl.⁶ ............................ B03B 1/04; B03B 5/28; B03D 1/02
[52] U.S. Cl. .................... 209/164; 209/9; 209/166; 209/173; 241/24.18; 241/24.28; 521/40.5; 521/41; 521/43.5
[58] Field of Search ............ 209/9, 164, 166, 209/173; 241/24.18, 24.28; 521/40.5, 41, 43.5

[56] References Cited

U.S. PATENT DOCUMENTS

| | | |
|---|---|---|
| 1,195,264 | 8/1916 | Pennigton . |
| 3,985,650 | 10/1976 | Saitoh . |
| 4,119,533 | 10/1978 | Saitoh . |
| 4,132,633 | 1/1979 | Saitoh . |
| 4,167,477 | 9/1979 | Valdez . |
| 5,377,844 | 1/1995 | Hwang . |
| 5,399,433 | 3/1995 | Kobler . |
| 5,566,832 | 10/1996 | Stuckrad . |

OTHER PUBLICATIONS

Buchan, R. and Yarar, B., "Recovering Plastics For Recycling by Mineral Processing Techniques", Feb. 1995, JOM, pp. 52–55.

*Primary Examiner*—Thomas M. Lithgow
*Attorney, Agent, or Firm*—Mason, Kolehmainen, Rathburn & Wyss

[57] ABSTRACT

An improved method is provided for separating acrylonitrile butadiene styrene (ABS) and high impact polystyrene (HIPS) plastics from each other. The ABS and HIPS plastics are shredded to provide a selected particle size. The shredded particles of the ABS and HIPS plastics are applied to a solution having a solution density in a predefined range between 1.055 gm/cm$^3$ and 1.07 gm/cm$^3$, a predefined surface tension in a range between 22 dynes/cm to 40 dynes/cm and a pH in the range of 1.77 and 2.05. In accordance with a feature of the invention, the novel method is provided for separating ABS and HIPS, two solid thermoplastics which have similar densities by selectively modifying the effective density of the HIPS using a binary solution with the appropriate properties, such as pH, density and surface tension, such as a solution of acetic acid and water or a quaternary solution having the appropriate density, surface tension, and pH.

14 Claims, 2 Drawing Sheets

METHOD FOR THE SEPARATION OF HIGH IMPACT POLYSTYRENE (HIPS) AND ACRYLONITRILE BUTADIENE STYRENE (ABS) PLASTICS

CONTRACTUAL ORIGIN OF THE INVENTION

The United States Government has rights in this invention pursuant to Contract No. W-31-109-ENG-38 between the United States Government and Argonne National Laboratory.

BACKGROUND OF THE INVENTION

1. Field of the Invention

The present invention relates to an improved method for the separation of different types of plastics, and more particularly to an improved process for the separation of acrylonitrile butadiene styrene (ABS) and high impact polystyrene (HIPS) plastics from each other.

2. Description of the Prior Art

Recycling of different types of plastics has increased in recent years. Processes for separating different plastic types have become increasingly important. For example, "Recovering Plastics for Recycling by Mineral Processing Techniques," by R. Buchan and B. Yarar, JOM, February, 1995, pps. 52–55, discloses a process for separating plastics by use of a mineral processing technology.

U.S. Pat. No. 5,399,433, issued Mar. 21, 1995 to Kobler, discloses a method for separating a polyethylene terephthalate (PET)/polyvinyl chloride (PVC) chip admixture. The PET/PVC chip admixture is contacted with a surface conditioning agent to produce relatively hydrophobic polyvinyl chloride chips which can be floated in an aerated aqueous medium. The polyethylene terephthalate chips are recovered from the bottom of the aqueous medium. The flotation is conducted in pure water without frothing or densifying agents.

Separation of solids using differences in their densities is a simple, economical and effective technique. A liquid whose density is between the densities of two solids can be used as the working medium. The solid with the lesser density floats and the solid with the higher density sinks resulting in the separation of the mixture. However, materials that have similar densities, such as acrylonitrile butadiene styrene, ABS, and high impact polystyrene, HIPS, can not be separated in high purities by this simple and inexpensive technique.

Different grades of both of the ABS and HIPS plastics have specific gravities in the range of 1.055 to 1.125. As a result such mixtures can not be effectively separated by density gradient procedures. Attempted separation of ABS and HIPS plastics by the inventors in their laboratory using conventional density gradient procedures has produced ABS product that is about 95% pure. However, 5% HIPS impurity in the ABS resulted in severe degradation of its properties, specifically its tensile and impact strengths because the two plastics are not compatible.

The recycling of white goods such as refrigerators in the United States and Europe involves the shredding of the refrigerators after the removal of the bulk refrigerants. The metallic content of the shredded material is then separated and recycled, and the non-metallic residue is considered waste, and is presently land filled. The two dominant plastics in refrigerators are acrylonitrile butadiene styrene (ABS) and high impact polystyrene HIPS. Other plastics may also be present, such as polypropylene, polyethylene, nylons and polyvinyl chloride. Many of these plastics can be separated from each other and from HIPS and ABS utilizing differences in density. Because ABS and HIPS have similar densities, ABS and HIPS are not separable by this method. ABS and HIPS are not compatible and a small amount of contamination of one in the other severely restricts its commercial value. One method that we successfully tested for separating HIPS from ABS takes advantage of the selective stickiness of the materials generated by solvents. While this method may be effective in separating the two plastics, the use of quantities of organic solvents has environmental drawbacks. Another technique that may be used for separating HIPS and ABS involves contacting the mixture with a surface that is heated to a temperature high enough for HIPS to stick to the hot surface but not hot enough for ABS to become sticky. Continuous cleaning of the hot surface is necessary to prevent sticking of the ABS to spots on the hot surface that have residual sticky HIPS.

It is an object of the present invention to provide an improved method process for the separation of acrylonitrile butadiene styrene (ABS) and high impact polystyrene (HIPS) plastics from each other.

It is another object of the present invention to provide such an improved method for separating ABS and HIPS plastics without requiring the use of organic solvents, and at ambient conditions to minimize energy consumption.

It is another object of the present invention to provide such an improved method that provides reliable and effective operation.

It is another object of the present invention to provide such an improved method that overcomes many of the disadvantages of prior art arrangements.

SUMMARY OF THE INVENTION

In accordance with these and other objects of the invention, an improved method is provided for separating acrylonitrile butadiene styrene (ABS) and high impact polystyrene (HIPS) plastics from waste streams and from each other. The ABS and HIPS plastics are shredded to provide a selected particle size. The shredded particles of the ABS and HIPS plastics are applied to a solution having a solution density in a predefined range between 1.055 gm/cm$^3$ and 1.07 gm/cm$^3$, a predefined surface tension in a range between 22 dynes/cm to 40 dynes/cm and a pH in the range of 1.77 and 2.05.

In accordance with a feature of the invention, the novel method is provided for separating ABS and HIPS, two solid thermoplastics which have similar densities by selectively modifying the effective density of the HIPS using a solution having the appropriate density, surface tension, and pH, such as acetic acid and water or hydrochloric acid, salt, surfactant and water. The acetic acid used in substantial mass ratios (50/50 volume basis) can achieve the desired surface tension, pH and density. Hydrochloric acid is used in small quantities to achieve the desired pH. A water soluble salt such as sodium chloride or calcium chloride can be used to raise the density and a surfactant can be added in minute quantities to achieve the desired surface tension. Other organic and inorganic acids can be substituted for the acetic and the hydrochloric acids as long as the surface tension, density and pH are maintained in the desired ranges. We conducted experiments with acetic acid, hydrochloric acid, sodium chloride, calcium chloride, and surfactants. The results were reproducible when the pH, density and surface tension were in the prescribed ranges. Each produced >99% pure ABS. Greater than 99% pure HIPS was also produced in one or two steps. The pure ABS was produced in a single step. The yields of ABS and of HIPS were greater than 90%. This was achieved at ambient temperature and pressure.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
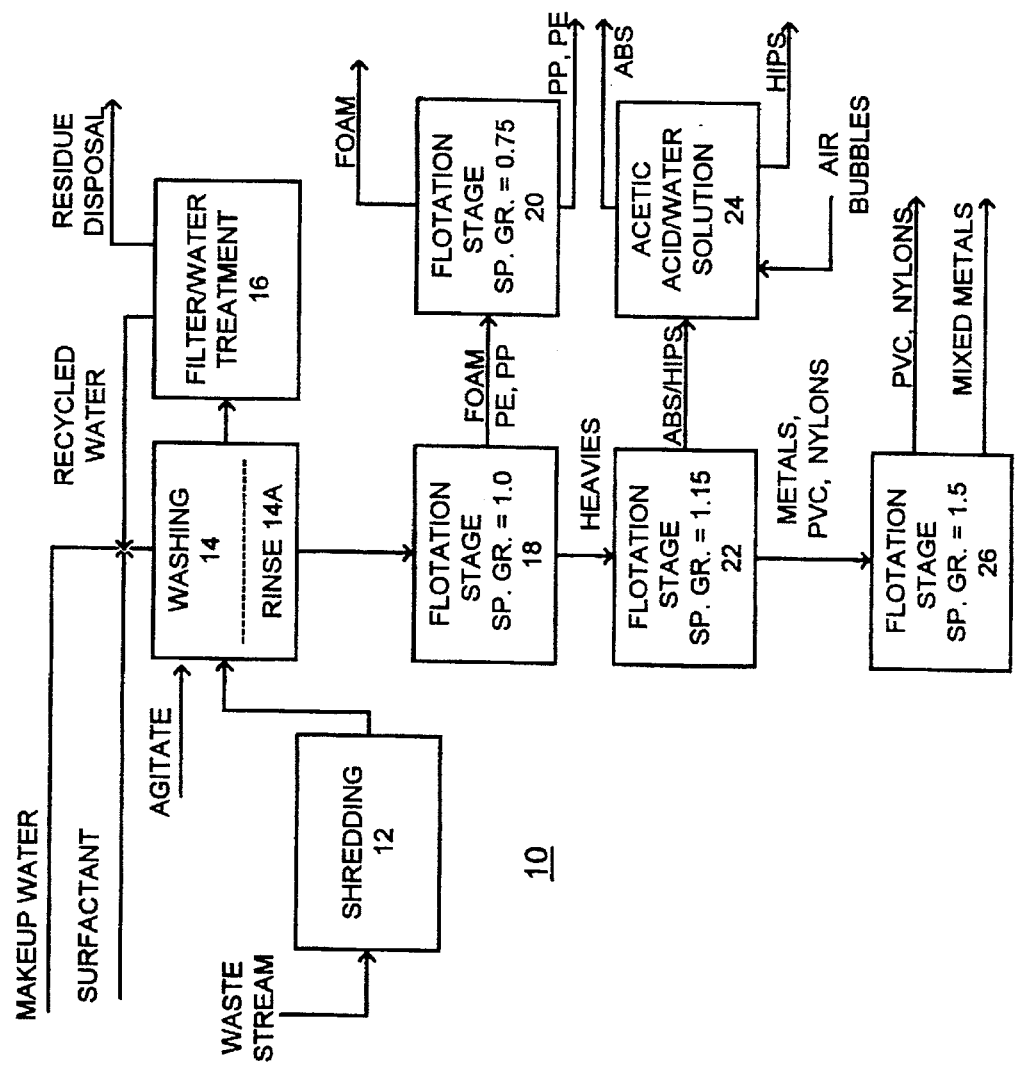
FIG. 1 is a process flow diagram illustrating apparatus for performing sequential steps of the process for the separation of acrylonitrile butadiene styrene (ABS) and high impact polystyrene (HIPS) plastics from a waste stream produced from obsolete refrigerators and from each other in accordance with the present invention.
Figure 2:
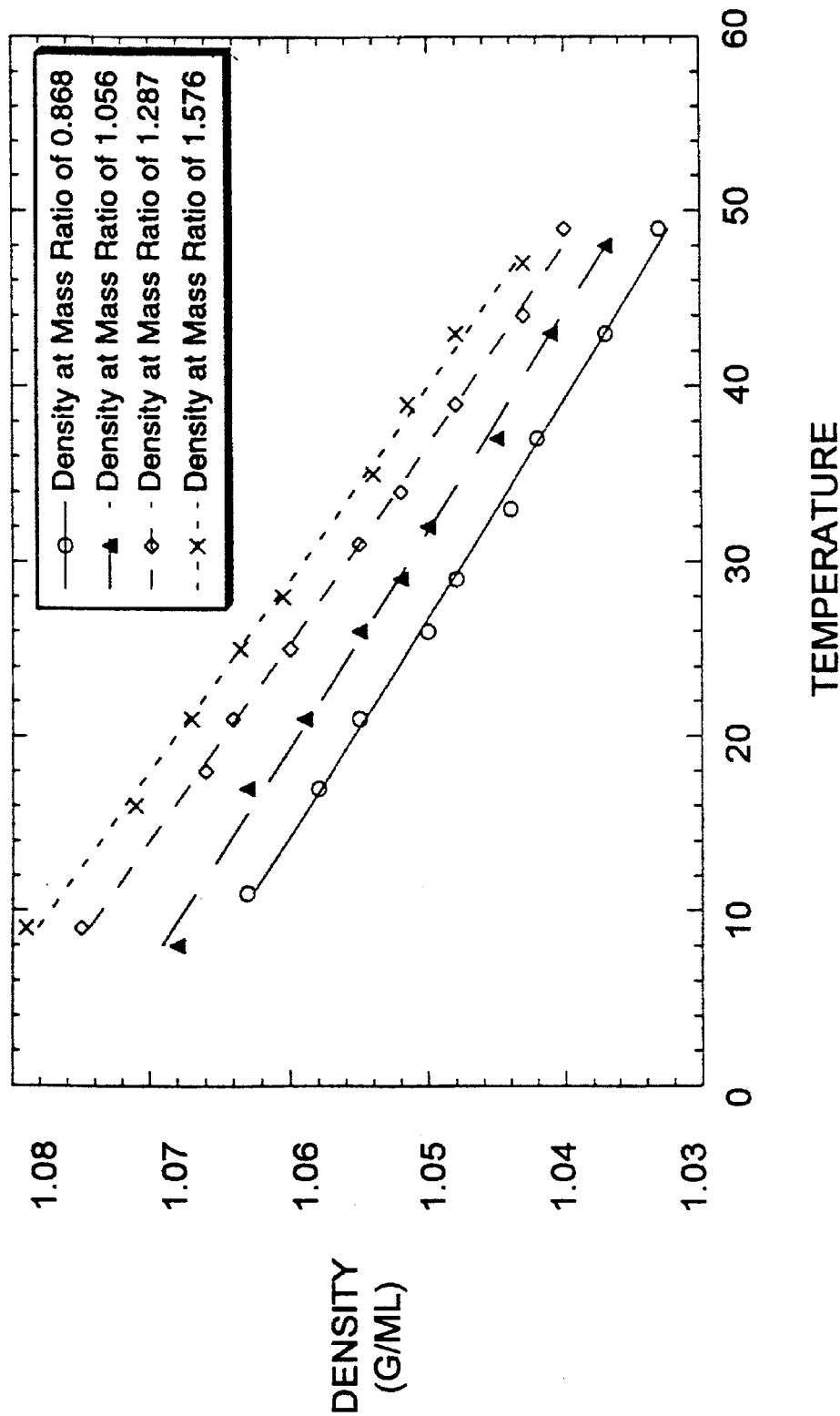
FIG. 2 is a chart illustrating density of acetic acid water solutions with different mass ratios along the vertical axis relative to temperature along the horizontal axis.

Referring to FIG. 1, there is shown a schematic and block diagram representation of a material processing system used for the effective separation of acryionitrile butadiene styrene (ABS) and high impact polystyrene (HIPS) plastics from a waste stream and from each other in accordance with the invention generally designated by the reference numeral 10. A waste steam containing at least the ABS and HIPS solid thermoplastics is applied to a shredding stage 12 and is ground to a selected size, for example, 0.25 inch or about 6.5 mm. The shredding step at stage 12 facilitates the liberation of rigid foam from refrigerator plastic-liner materials. After shredding, the material is washed with water and surfactants at a washing stage 14 to remove dirt and any residual oils. To enhance the cleaning step, the waste stream is agitated at the washing stage 14. The waste stream being processed is applied to a rinsing stage 14A, after the washing stage 14. The waste water resulting from the washing stage 14 is applied to a filter and water treatment stage 16 where the waste water is first filtered to trap its solids contents and then treated and fed back to the washing stage 14 to be reused. The filter and water treatment step at stage 16 is used to minimize the generation of waste water. A first flotation stage 18 where the specific gravity is maintained at approximately 1.0 separates light materials, such as foam, polypropylene (PP) and polyethylene (PE) from the heavier materials. The washing stage 14 can be used as the first floatation stage, unless the feed material is excessively dirty to the point where the density in the wash tank changes rapidly. Paddle wheels or wipers can be used at the first flotation stage 18 to skim any floaters out of the tank and drop them on a screen to drain. Water that drains from the light materials can be pumped back into the stage 18. Foam can be separated from the PP and PE in a flotation stage 20 having a specific gravity between 0.7 and 0.85 or using other means such as hydrocyclones.

The washed heavy materials are then separated into two fractions by a flotation stage 22 having a specific gravity maintained at about 1.10–1.15. Operating at a specific gravity closer to 1.10 will decrease the ABS and HIPS yields but will guard against contamination of the ABS and HIPS products with other plastics such as nylons, that are commonly used in home appliances. The high value plastics, ABS and HIPS are the first fraction. The second fraction contains the heavier constituents o the waste stream, such as PVC, nylons, and the residual metals. Both ABS and HIPS have specific gravities in the range of 1,055 and 1,125 and cannot be separated from each other in high purity by using conventional gravity-separation techniques. In a preferred arrangement, an-acid and water solution at ambient temperature and pressure having a pH of about 1.77, a surface tension of about 22–40 dynes/cm and a density of about 1,067 gm/cm$^3$, such as an acetic acid and water solution 24 having air bubbles passed upwardly through the solution is used for separating the mixture of HIPS and ABS. The air bubbles adhere to the HIPS, carrying the HIPS to the surface of the solution while the ABS remains at the bottom of the container. Introduction of air bubbles is not always required. As a matter of fact, when acetic acid or hydrochloric acid is used we did not need to introduce air to get good separation. Even when needed it should be administered at low enough velocities and bubble sizes to avoid disturbing the settling ABS chips. Operating at higher surface tension values (>40 dynes/cm and up to ≅45 dynes/cm) is also possible, but the stability of the settling ABS chips is reduced as the surface tension is increased. Operation at surface tension values of 22–30 is preferred. Surface tension values less than 22 also resulted in reducing the purity of the products. A third flotation stage 26 having a specific gravity of about 1.35 separates the PVC and nylons from the mixed metals.

In brief summary, our experimental data verifies that ABS and HIPS streams, each having a purity greater than 99%, can be separated from a HIPS/ABS mixture with over 90% yield of each at ambient temperatures (18°–28° C.) and in a single step, or in two steps when several grades of these species are present, using aqueous solutions having densities in the range of 1.055 to 1.07 grams/milliliter, and having surface tension values in the range of 22 to 40 dynes/centimeter, and a pH in the range of 1.77–2.05. The appropriate combination of these parameters have to be used to get products with >99% purity and >90% yield, demonstrated using solutions containing:

Acetic acid or hydrochloric acid

Sodium or calcium chloride

Surfactants, and

Water

We realize that other aqueous solutions containing organic or inorganic acids and other salts and surfactants that can generate the right operating conditions can also be used to achieve the same goals.

EXPERIMENTAL OBSERVATIONS

While conducting small scale experiments on HIPS and ABS exposed to acetic acid and acetic acid/water solutions, it was observed that when a mixture of these solids was introduced into glacial acetic acid (liquid at room temperature), a significant portion of the HIPS floated while the ABS sank. The ABS, the HIPS and the glacial acetic acid all have a density of about 1.055 g/cm$^3$. The same behavior was later observed when a mixture of these solids was dropped in a 50/50 (volume basis) acetic acid/water solution. The tests were repeated using recycled HIPS and ABS obtained from scrapped refrigerators that had densities of about 1.055 to 1.125 g/cm$^3$. The same results as with the virgin materials were observed.

Examination of the HIPS and ABS solids during these tests, while in the solution under a magnifying glass showed that the surface of the HIPS particles was covered with one or more layers of tiny gas bubbles. The surface of the ABS particles contained very few scattered bubbles. This phenomenon reduced the effective density of the HIPS particles below that of the solution and thus the HIPS floated, while the density of the ABS particles was maintained above that of the solution. The addition of the acetic acid to the water reduced the surface tension, having the effect of a surfactant, while increasing the density and reducing pH. When a mixture of recycled HIPS and ABS was dropped into a 20/80 (volume basis) solution of acetic acid/water, both solids sank. This is an indication that the density of the solution has dropped below the apparent density of the gas-bubbles-coated HIPS particles. The addition of a surfactant to the 50/50 solution, in which the HIPS has been separated from the ABS, resulted in HIPS sinking along with the ABS. This is an indication that the layers of gas bubbles on the HIPS have been lost as the surface tension dropped below a certain level.

We concluded from the test results in that a liquid having the appropriate surface tension, pH, viscosity and density can be used to separate HIPS and ABS which have similar densities but have different surface interactions with the liquid solution. The principle described here can be used to separate a variety of solid mixtures using a liquid having the appropriate surface tension, pH, viscosity and density, where the solids have different surface interactions with the liquid solution. This principle can also be used as a polishing step for many density gradient based separation methods.

The acetic acid/water solution we used was somewhat unique because the appropriate pH, density, surface tension and viscosity were achieved using a binary solution. We also achieved similar results using a quaternary solution of hydrochloric acid, sodium chloride, water and a surfactant. For example, a description of one test with a quaternary solution follows. About 2 liters of tap water were placed in a three liter beaker. Sodium chloride was added to the water until the solution density was increased to about 1.067 grams/cm$^3$. A small amount of a surfactant was added to the solution to reduce its surface tension to between 22 and 32 dynes/cm in different experiments. Concentrated hydrochloric acid (37% solution) was then added to bring the pH of the solution down to about 1.77 while the solution was being mixed by agitation. A mixture of about 250 grams of post consumer product HIPS and ABS in the form of approximately 0.25 inch chips, that was produced from obsolete refrigerators and from which metals, foam, nylons and PVC had been separated, was then added to the solution. The solution and its contents were then stirred for about 30 seconds and allowed to settle. In less than one minute a fraction of the added plastics floats and another fraction sinks. The two fractions were collected and analyzed piece by piece using an FTIR machine. The results showed over 99% pure ABS in the fraction that sunk.

We conducted experiments on mixtures of recycled HIPS and ABS using acetic acid/water solutions at acetic acid to water mixing volume ratios in the range of 0 (no acetic acid) to 1 (no water). We also varied the temperature to alter the density at a given solution composition. Analysis of the ABS fraction produced from these experiments showed that ABS fractions having greater than 99% purity (less than 1% HIPS) were produced in a single pass when the solution density was in the range of 1.055 and 1.067 gm/cm$^3$, and the pH was in the range of 1.77 and 2.05. Acetic acid solutions that had these properties had surface tension values in the range of 30 to 40 dynes/cm. The changes in viscosity were minimal. Hips fractions having greater than 99% purity (less that 1% ABS) were also produced using solutions having properties in the ranges specified above in one or two passes and using one or two solutions, depending upon the number of different grades of each plastic present. The yields on ABS and HIPS were greater than 90%. We like to point out here that the recycled ABS/HIPS stream contains many different grades of these plastics that were produced over a number of years and by more than one manufacturer.

We identified a range of operating conditions that produce ABS and HIPS products having greater than 99% purity. These products can be upgraded using commercially available modifiers to raise the properties of the recycled material close to those of their virgin counterparts. We demonstrated the appropriateness of these operating conditions by achieving similar results using a quaternary solution of hydrochloric acid, sodium chloride, water, and a surfactant.

While the present invention has been described with reference to the details of the embodiments of the invention shown in the drawing, these details are not intended to limit the scope of the invention as claimed in the appended claims.

What is claimed is:

1. A method for separating acrylonitrile butadiene styrene (ABS) and high impact polystyrene (HIPS) plastics from each other comprising the steps of:

shredding the ABS and HIPS plastics to provide a selected particle size; and applying the shredded particles of the ABS and HIPS plastics to a solution having a solution density in a predefined range between 1.055 gm/cm$^3$ and 1.07 gm/cm$^3$, a predefined surface tension in a range between 22 dynes/cm to 40 dynes/cm and a pH in the range of 1.77 and 2.05 wherein the plastics separate from each other by the high impact polystyrene (HIPS) forming a floating fraction in the solution and the acrylonitrile butadiene styrene (ABS) forming a sink fraction.

2. A method for as recited in claim 1 wherein said step of applying the shredded particles of the ABS and HIPS plastics to said solution includes the step of providing a solution of acetic acid and water.

3. A method for as recited in claim 1 wherein said step of applying the shredded particles of the ABS and HIPS plastics to said solution includes the step of providing a solution of approximately equal parts of acetic acid and water by volume.

4. A method for as recited in claim 1 wherein said step of shredding the ABS and HIPS plastics to provide said selected particle size includes the step of shredding the ABS and HIPS plastics to provide said particle size of about 6.5 mm.

5. A method for as recited in claim 1 wherein said step of applying the shredded particles of the ABS and HIPS plastics to said solution includes the step of providing a quaternary solution of hydrochloric acid, sodium chloride, water and a surfactant.

6. A method for as recited in claim 1 wherein said step of applying the shredded particles of the ABS and HIPS plastics to said solution includes the step of providing a quaternary solution of hydrochloric acid, calcium chloride, water and a surfactant.

7. A method for as recited in claim 1 wherein said step of applying the shredded particles of the ABS and HIPS plastics to said solution includes the step of providing a quaternary solution of hydrochloric acid, water soluble salts, water and a surfactant.

8. A method for as recited in claim 1 further includes the step of washing the ground particles of ABS and HIPS plastics prior to applying the shredded particles to the solution.

9. A method for as recited in claim 1 further includes the step of separating the shredded particles of ABS and HIPS plastics from lighter materials with a flotation stage having a specific gravity of about 1.0 prior to applying the shredded particles to said solution.

10. A method for as recited in claim 1 further includes the step of separating the shredded particles of ABS and HIPS plastics from heavier materials with a flotation stage having a specific gravity of about 1.10 to 1.125.

11. A method for separating acrylonitrile butadiene styrene (ABS) and high impact polystyrene (HIPS) plastics from each other comprising the steps of:

shredding the ABS and HIPS plastics to provide a selected particle size; and applying the shredded particles of the ABS and HIPS plastics to a binary solution of acetic acid and water having a solution density in a predefined range between 1.055 gm/cm$^3$ and 1.07 gm/cm$^3$ a predefined surface tension in a range between 22 dynes/cm to 40 dynes/cm and a pH in the range of 1.77 and 2.05 wherein the plastics separate from each other by the high impact polystyrene (HIPS) forming a floating fraction in the solution and the acrylonitrile butadiene styrene (ABS) forming a sink fraction.

12. A method for separating acrylonitrile butadiene styrene (ABS) and high impact polystyrene (HIPS) plastics from each other comprising the steps of:

shredding the ABS and HIPS plastics to provide a selected particle size; and applying the shredded particles of the ABS and HIPS plastics to a quaternary solution having a solution density in a predefined range between 1.055 gm/cm$^3$ and 1.07 gm/cm$^3$, a predefined surface tension in a range between 22 dynes/cm to 40 dynes/cm and a pH in the range of 1.77 and 2.05 wherein the plastics separate from each other by the high impact polystyrene forming a floating fraction in the solution and the acrylonitrile butadiene styrene (ABS) forming a sink fraction.

13. A method for as recited in claim 12 wherein said step of applying the shredded particles of the ABS and HIPS plastics to said quaternary solution includes the step of providing a quaternary solution of hydrochloric acid, calcium chloride, water and a surfactant.

14. A method for as recited in claim 12 wherein said step of applying the shredded particles of the ABS and HIPS plastics to said quaternary solution includes the step of providing a quaternary solution of hydrochloric acid, sodium chloride, water and a surfactant.

* * * * *